2,224,007

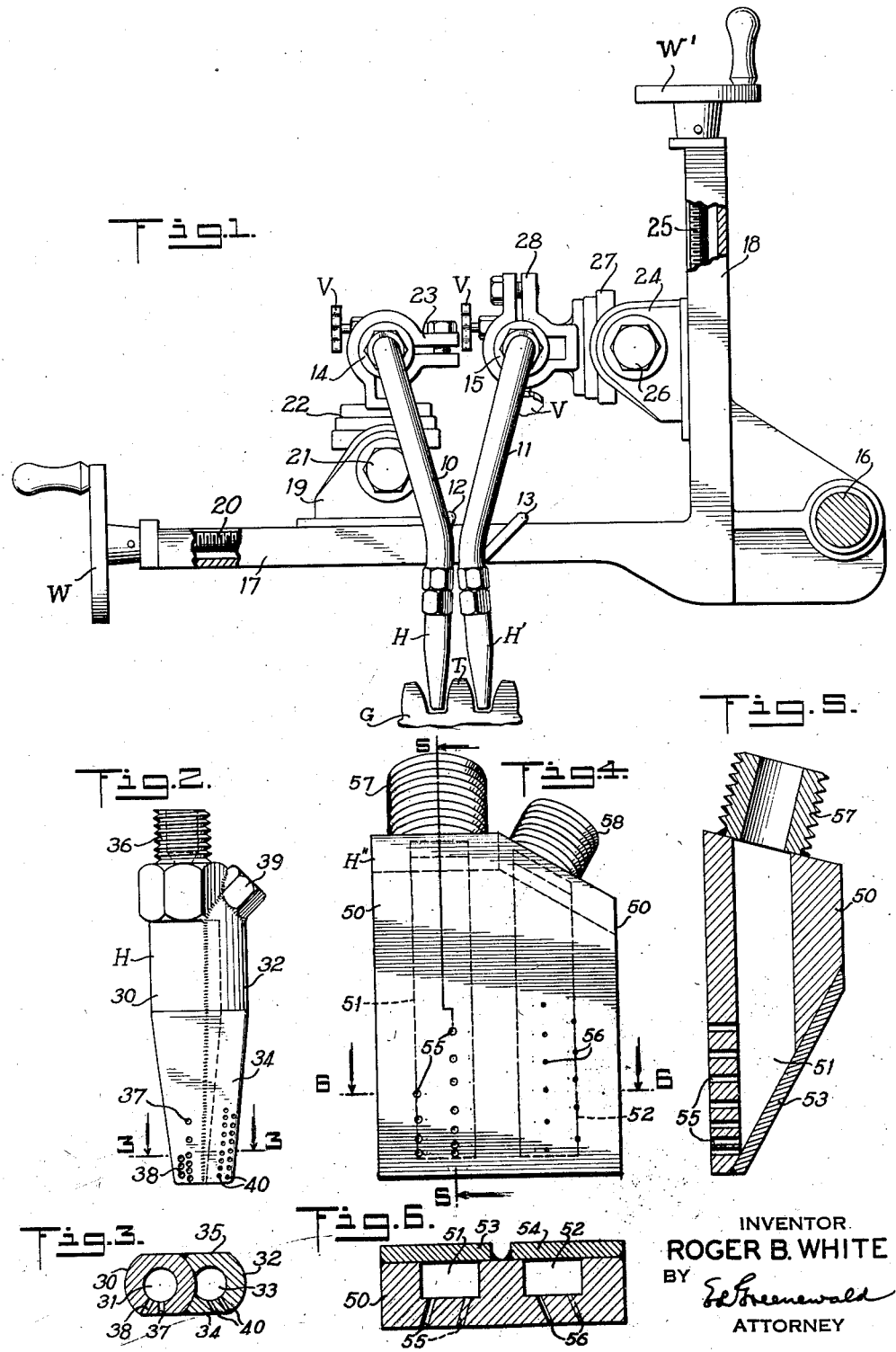
Dec. 3, 1940.  R. B. WHITE  2,224,007
APPARATUS FOR HEAT-TREATING METAL BODIES
Filed Oct. 16, 1937
INVENTOR.
ROGER B. WHITE
BY
ATTORNEY Patented Dec. 3, 1940

UNITED STATES PATENT OFFICE 2,224,007

APPARATUS FOR HEAT-TREATING METAL BODIES

Roger B. White, Cleveland, Ohio, assignor to Oxweld Acetylene Company, a corporation of West Virginia Application October 16, 1937, Serial No. 169,379

9 Claims. (Cl. 266—23)

This invention relates to the heat-treatment of metal bodies such as gears, and more particularly to apparatus for hardening gear teeth by means of a source of high temperature heat, such as an oxy-acetylene blowpipe flame.

Heretofore, gear teeth have been hardened by traversing the surface of a gear tooth with a single blowpipe, usually an ordinary welding blowpipe, and following the same with a quenching jet directed from a tube or nozzle onto the heated surface. If the quenching jet is directed upon the heated surface at a point too close to the heating flame, it tends to interfere with the heating flame; and if the quenching jet is directed onto the heated surface at a considerable distance away from the heating flame, to prevent interference with the same, the desired hardness is not always produced. Furthermore, a jet directed from a tube or nozzle does not always produce a uniform quenching effect, and a non-uniform quenching effect results in non-uniformity of hardness.

In addition, it has been necessary to circulate a cooling fluid, such as water, through the blowpipe heads, since they tend to become overheated due to the high temperature of the heating flames and the limited space between gear teeth. However, this necessitates a larger structure, and it is often difficult to insert such a larger structure between two closely spaced gear teeth.

It is particularly desirable to harden simultaneously both sides of a gear tooth, since reheating of a previously hardened surface is prevented, and stresses resulting from unequal expansion and contraction of one side of the gear tooth are avoided. Heretofore, supports for blowpipes having heads adapted to harden both sides of a gear tooth simultaneously have been cumbersome, involving a large number of parts and acquiring a considerable number of adjustments to obtain the correct position of the blowpipe heads relatively to each other and to the gear tooth. A smaller number of parts reduces the cost of such apparatus, and a decrease in the number of adjustments which have to be made necessarily reduces the time consumed in hardening, thus reducing the cost of treatment.

The principal objects of this invention are to provide apparatus for heat-treating gear teeth by which the surface portion to be hardened is heated and quenched uniformly; to provide apparatus which includes a novel support for a pair of blowpipes; to provide apparatus by which the opposite surfaces of a single tooth may be hardened simultaneously; and to provide a blowpipe head which is compact in structure and is adapted to be inserted between two closely spaced gear teeth. Other objects and novel features of this invention will become apparent from the following description and accompanying drawing, in which:

Fig. 1 is a partial end view of a gear and apparatus constructed in accordance with this invention, illustrating the hardening of the surfaces of a tooth of the gear;

Fig. 2 is a front view of a blowpipe head of the apparatus of Fig. 1;

Fig. 3 is a horizontal sectional view, on an enlarged scale, taken along the line 3—3 of Fig. 2;

Fig. 4 is a front view of an alternative construction of blowpipe head;

Fig. 5 is a vertical sectional view taken along the line 5—5 of Fig. 4; and

Fig. 6 is a horizontal sectional view taken along the line 6—6 of Fig. 4.

Apparatus constructed in accordance with this invention is particularly adapted to carry out a method in which the surfaces of a gear tooth are heated and quenched uniformly by applying thereto a plurality of high temperature heating flames and a plurality of quenching jets, the quenching jets being directed onto the heated surface at a point closely adjacent to the heating flames but in a direction rearwardly of and away from the heating flames so as to prevent interference with the heating flames. Furthermore, each of the surfaces of a gear tooth are heated and quenched and thereby hardened simultaneously, thus avoiding the possibility of softening a surface already hardened due to heat being carried through the tooth when the opposite surface is hardened; and to provide a more compact construction, the cooling fluid, such as water, for the blowpipe heads is also utilized as a quenching medium.

This method may be carried out as in Fig. 1, in which a plurality of heating flames and quenching jets are directed from two blowpipe heads H and H' onto the surfaces of a tooth T of a gear G in order to harden the same, each surface, as understood herein, including both the face, which extends from the pitch circle to the top or "top land," and also the flank, which extends from the pitch circle to the root of the tooth. The blowpipe heads H and H' are substantially identical in construction, except that the relative positions of the parts are transposed so that one is right hand and the other is left hand; and they receive a combustible mixture, such as a mixture of oxygen and acetylene, through conduits 10 and 11, and a cooling and quenching fluid, such as water, through conduits 12 and 13. The conduits 10 and 11 are connected to the bodies or handles 14 and 15 of conventional oxy-acetylene blowpipes provided with valves V for controlling a supply of the combustible mixture, and the conduits 12 and 13 are connected to a suitable source of supply of the cooling and quenching fluid.

The blowpipes and blowpipe heads are supported in operative relation with respect to the tooth T by a support which includes a frame attached to a rod 16 and provided with a slotted horizontal arm 17 and a slotted vertical arm 18. The horizontal arm 17 supports a slide 19 which is in threaded engagement with a suitable screw 20 operated by a hand-wheel W; and the slide 19 is provided with a bolt 21 which passes through a suitable hole in a supporting member 22, in turn provided with a clamp 23 in which the blowpipe body 14 is held. Similarly, the vertical arm 18 supports a vertical slide 24 which is in threaded engagement with a screw 25 operated by a hand-wheel W'; and the slide 24 is provided with a bolt 26 which passes through a suitable hole in a supporting member 27, which in turn is provided with a clamp 28 in which the blowpipe handle 15 is held. The supporting members 22 and 27, respectively, are adapted to pivot about the bolts 21 and 26 and to be clamped in any desired angular position by the bolts; and the hand-wheels W and W' are adapted to adjust the horizontal and vertical positions of the heads H and H', respectively. The conduits 10 and 11 extend horizontally, or outwardly away from the drawing, for a sufficient distance so that the entire supporting mechanism is disposed back of the gear G. The rod 16 may be vertically and horizontally adjustably mounted upon suitable traversing means (not shown), such as the tool carriage of a lathe or a suitable carriage movable along a track disposed parallel to the tooth T; and the heads H and H' are moved along the tooth in a direction outwardly from the drawing by the traversing means.

In further accordance with this invention, the blow-pipe head is so constructed that the same fluid may be used both for cooling and quenching, the heating gas being passed through a distributing passage longitudinally of the head and then through a plurality of discharge outlets disposed in two or more rows in staggered relation; and the quenching fluid is passed through a distributing passage lying alongside of and substantially parallel to the heating gas distributing passage and then directed onto the heated surface through a plurality of outlets inclined at an angle rearwardly and away from the heating gas outlets.

A head H, constructed in accordance with the above principles and illustrated in Figs. 2 and 3, comprises a main body 30, provided with a heating gas distributing passage 31, and a second body 32 integrally secured to the body 30 in a suitable manner, such as by welding, and providing a cooling and quenching fluid distributing passage 33. The main body 30 may be formed by an ordinary blowpipe tip, and the body 32 by a second tip having certain portions thereof removed so that it will fit closely against the body 30. As the bodies 30 and 32 are integrally united, they will form a unitary body, and the cooling fluid passing through the passage 33 will adequately cool the entire structure. The lower ends of the bodies 30 and 32 are preferably machined off or ground down on two sides so as to form flat surfaces 34 and 35 tapering downwardly toward each other so that the head may be inserted between two closely spaced gear teeth.

The body 30 is provided with an inlet connection 36 at the upper end thereof, to which the combustible mixture conduit 10 may be connected, and at the lower end thereof with a plurality of heating gas outlets 37 and 38 leading from the distributing passage 31 and terminating in the surface 34. The outlets 37 are disposed in a vertical row, and are spaced at increasing distances from the lower to the upper end of the row so as to supply a greater amount of heat adjacent the root of the tooth and a progressively lesser amount towards the top in order to heat uniformly the surface to be hardened. The outlets 38 are disposed in a second vertical row in staggered relation with respect to the outlets 37, and may be directed forwardly, as shown, or may be parallel to the outlets 37.

An inlet connection 39, to which the cooling and quenching fluid conduit 12 may be connected, is integrally attached to the bodies 30 and 32 in a suitable manner, such as by welding, so as to connect with the passage 33 at the upper end thereof. A plurality of quenching fluid outlets 40, leading from the lower end of the passage 33 and terminating in the surface 34, are disposed in two vertical rows substantially parallel to the rows of heating gas outlets. The quenching fluid outlets of one row are preferably disposed in staggered relation with respect to the outlets of the second row, and also are inclined rearwardly and away from the heating gas outlets 37 at a suitable angle, such as 30°, to prevent interference with the heating flames.

An alternative head H'', as illustrated in Figs. 4 to 6, comprises a unitary body 50 provided with a combustible mixture distributing passage or channel 51 and a cooling and quenching fluid distributing channel or passage 52, the channels 51 and 52 being disposed alongside each other and as closely together as possible. The lower end of the body 50 is tapered so that the head may be inserted between two closely spaced gear teeth, and the lower open end of the channels 51 and 52 are closed by plates 53 and 54, respectively, which are attached to the body 52 in a suitable manner, such as by welding or brazing.

Leading from the lower end of the combustible mixture distributing channel 51 are a plurality of heating gas outlets 55 which are disposed in a plurality of parallel vertical rows, the outlets in each row being in vertically staggered relation with respect to the outlets of an adjacent row and the outlets of each row being spaced at increasing distances apart from the lower to the upper end thereof in order to provide a more uniform heating effect. The outlets 55 may be inclined forwardly at a suitable angle, such as 20°, to eliminate popping and backfiring in hardening small gear teeth, since the heads will be very close together, and when a gear tooth is not between the heads there is a tendency for directly opposed flames to interfere with each other.

Leading from the lower portion of the cooling and quenching fluid distributing channel 52 are a plurality of quenching fluid outlets 56, which are disposed in a plurality of vertical rows substantially parallel to the rows of heating gas outlets and which are inclined rearwardly at a suitable angle, such as 20°, in order to prevent interference with the heating flames.

The body 50 is also provided with an inlet connection 57 at the upper end of the channel 51, to which a combustible mixture conduit may be connected; and a cooling and quenching fluid inlet 58 at the upper end of the channel 52, to which a cooling and quenching fluid conduit may be connected.

In each of the heads illustrated, the vertical extent of the heating gas outlets is preferably such that the uppermost outlet will direct a heating flame onto the tooth surface at a point removed from the top so that the portion of the surface closely adjacent the top is heated only by conduction; and the vertical extent of the quenching jet outlets is preferably such that the uppermost outlet may be set below the top of the tooth to prevent any of the quenching fluid from spraying over the top of the tooth and striking a jet from the opposite head, and thereby prevent splashing and interference with the heating flames.

Although alternative heads and specific methods of constructing them have been described, it is to be understood that other heads may be used in connection with the apparatus of this invention. It is to be further understood that the apparatus of this invention may be utilized in the heat-treatment of the teeth of worm gears or racks, of screw threads, or similar portions of metal bodies; and that other changes may be made which will not depart from the spirit and scope of this invention.

What is claimed is:

1. Apparatus for heat-treating a portion of a metal body comprising a blowpipe head having a combustible gas passage formed therein and a plurality of heating gas outlets of substantially equal diameter leading therefrom, said plurality of outlets being disposed in at least one row with the distance between centers of adjoining outlets at one end of a row being greater than at the other end of said row; a cooling and quenching fluid passage formed therein adjacent said combustible gas passage; and a plurality of outlets leading from said cooling fluid passage for directing the cooling fluid onto the heated surface, said cooling fluid outlets being disposed in staggered relation in at least two rows on the same side of, adjacent, and substantially parallel to said row of heating gas outlets.

2. Apparatus for heat-treating a gear tooth comprising a blowpipe head having a combustible gas passage formed therein; a plurality of outlets disposed in at least one row and leading from said passage for directing heating flames upon a surface of a gear tooth, said outlets having substantially equal diameters and the centers of adjoining outlets being spaced at increasing distances apart from one end of a row to the other; a cooling and quenching fluid passage formed in said head alongside said combustible gas passage; and a plurality of outlets leading from said cooling fluid passage and inclined away from said heating outlets for directing a cooling fluid onto the heated surface adjacent said heating flames, said cooling outlets being disposed in at least two closely adjacent rows on the same side of and substantially parallel to said row of heating outlets.

3. Apparatus for heat-treating a gear tooth as defined in claim 2, in which said plurality of cooling outlets diverge from said plurality of heating outlets at an angle of substantially 30°.

4. Apparatus as defined in claim 2, in which said plurality of heating outlets are inclined forwardly with respect to said head so as to direct heating flames forwardly upon the surface of said tooth, and said plurality of cooling outlets are inclined rearwardly with respect to said head so as to direct quenching jets rearwardly upon the surface of said tooth as said blowpipe head is moved relatively with respect to said surface and substantially parallel to the same.

5. Apparatus for heat-treating a horizontally disposed gear tooth comprising, in combination, a pair of blowpipe heads, one of said heads being adapted to direct high temperature heating flames and a quenching fluid against successive portions of one of the surfaces of said tooth and the other of said heads being adapted to direct high temperature heating flames and a quenching fluid against successive portions of the opposite surface of said tooth; a pair of blowpipes having longitudinal axes extending in substantially the same generally horizontal direction and each being adapted to supply a combustible mixture of gases to one of said heads; means for supplying said heads with a cooling and quenching fluid; and means for supporting said heads in operative relation with respect to said tooth, said means including a separately adjustable support for each of said blowpipes, one support being movable in a horizontal direction and adjustable radially about an axis extending in the same general direction as the longitudinal axis of one blowpipe, and the other support being movable in a vertical direction and adjustable radially about an axis extending in the same general direction as the longitudinal axis of the other blowpipe.

6. Apparatus for heat-treating gear teeth comprising a blowpipe having a head for directing high temperature heating flames against successive portions of one of the surfaces of a gear tooth; a second blowpipe having a head for simultaneously directing high temperature heating flames against successive portions of the opposite surface of said tooth; a slide movable in a predetermined direction; a second slide movable in a direction substantially perpendicular to the direction of movement of said first-named slide, the paths of movement of said slides lying substantially in the same plane; means for supporting one of said blowpipes and pivotally mounted on said first-named slide; and means for supporting the other of said blowpipes and pivotally mounted on said second slide, each of said supporting means being pivotable about an axis substantially perpendicular to the plane of movement of said slides.

7. Apparatus for heat-treating gear teeth comprising a blowpipe having a head for directing high temperature heating flames against successive portions of a surface of a gear tooth; a second blowpipe having a head for simultaneously directing high temperature heating flames against successive portions of the opposite surface of said tooth; a pair of slides, one of said slides being movable in a predetermined path lying in a plane, and the other of said slides being movable in a predetermined path lying in a plane substantially perpendicular to said first-mentioned plane, the paths of movement of each of said slides being substantially perpendicular to the line of intersection of said perpendicular planes; means supporting one of said blowpipes and pivotally mounted on one of said slides; and means for supporting the other of said blowpipes and pivotally mounted on the other of said slides, each of said supporting means being pivotable about an axis substantially parallel to the line of intersection of said perpendicular planes.

8. Apparatus for heat-treating gear teeth comprising, in combination, a blowpipe having a head for directing high temperature heating flames against successive portions of one of the surfaces of a gear tooth; a second blowpipe having a head for simultaneously directing high temperature heating flames against successive portions of the opposite surface of said tooth; a supporting frame having a pair of arms extending away from each other in substantially perpendicular directions; a slide movable along one arm; a second slide movable along the other arm; means mounted on the first slide for supporting one blowpipe for pivotal movement about an axis substantially perpendicular to both arms; and means mounted on the second slide for supporting the other blowpipe for pivotal movement about an axis also substantially perpendicular to both arms.

9. Apparatus for heat-treating gear teeth comprising, in combination, a blowpipe having a head for directing high temperature heating flames against successive portions of a surface of a gear tooth; a second blowpipe having a head for simultaneously directing high temperature heating flames against successive portions of the opposite surface of said tooth; a support including a pair of arms and a slide movable along each arm, one arm extending in a predetermined direction lying in a plane and the other arm extending in a predetermined direction lying in a plane substantially perpendicular to said first-named plane, the direction in which each arm extends and the path of movement of each slide being substantially perpendicular to the line of intersection of said perpendicular planes; means mounted on one slide for supporting one blowpipe for pivotal movement about an axis substantially parallel to the line of intersection of said perpendicular planes; and means mounted on the other slide for supporting the other blowpipe for pivotal movement about an axis also substantially parallel to the line of intersection of said planes.

ROGER B. WHITE.